United States Patent
Maeda

[11] Patent Number: 6,137,518
[45] Date of Patent: Oct. 24, 2000

[54] IMAGE FORMING APPARATUS HAVING AN LED ARRAY HEAD FOR FORMING IMAGE DOTS BASED ON A PITCH OF THE LEDS

[75] Inventor: Katsuhiko Maeda, Kanagawa, Japan

[73] Assignee: Ricoh Company, Ltd., Tokyo, Japan

[21] Appl. No.: 09/168,563

[22] Filed: Oct. 9, 1998

[30] Foreign Application Priority Data

Oct. 9, 1997 [JP] Japan .................................. 9-276974

[51] Int. Cl.$^7$ ............................ G03G 13/04; B41J 2/385
[52] U.S. Cl. ............................................ 347/131; 347/130
[58] Field of Search ................................. 347/118, 119, 347/129, 131, 224, 225, 233, 238, 241, 130; 358/459, 298; 399/181

[56] References Cited

U.S. PATENT DOCUMENTS

| | | | |
|---|---|---|---|
| 4,734,714 | 3/1988 | Takasu et al. | 347/238 X |
| 5,258,629 | 11/1993 | Itoh et al. | 347/238 X |
| 5,305,022 | 4/1994 | Ota et al. | 347/233 |
| 5,481,292 | 1/1996 | Reinten | 347/238 |
| 5,691,759 | 11/1997 | Hanson | 347/233 |
| 5,896,162 | 4/1999 | Taniguchi et al. | 347/241 X |
| 5,926,203 | 7/1999 | Shimura et al. | 347/238 |
| 5,930,568 | 7/1999 | Ito et al. | 347/131 X |
| 6,034,712 | 3/2000 | Iwasaki | 347/241 |

FOREIGN PATENT DOCUMENTS

| | | |
|---|---|---|
| 2-162063 | 6/1990 | Japan . |
| 10-217538 | 8/1998 | Japan . |

*Primary Examiner*—Susan S. Y. Lee
*Attorney, Agent, or Firm*—Oblon, Spivak, McClelland, Maier & Neustadt, P.C.

[57] ABSTRACT

In an image forming apparatus for electrophotographically forming an image with an LED (Light Emitting Diode) array having a number of LEDs arranged in an array for controllably emitting light in accordance with image data, dots to be respectively formed by the LEDs have a target dot diameter X satisfying a relation of $P<X<2P$ where P is a pitch P between the LEDs. Despite that the dot diameters of LEDs may slightly differ from each other, an image free from noticeable white stripes or black stripes is achievable although some difference in density may occur, depending on the overlapping degree of or the distance between dots.

8 Claims, 14 Drawing Sheets

IMAGE FORMING APPARATUS HAVING AN LED ARRAY HEAD FOR FORMING IMAGE DOTS BASED ON A PITCH OF THE LEDS

BACKGROUND OF THE INVENTION

The present invention relates to a printer, digital copier, facsimile apparatus or similar image forming apparatus for forming an image with optical writing means implemented as an LED (Light Emitting Diode) array head.

In an image forming apparatus for forming images by electrophotography, laser optics including a laser and a polygonal mirror for steering a laser beam issuing from the laser has been predominant over the other optical writing means. Today, an LED array head including an LED array and a lens array is attracting increasing attention as optical writing means capable of promoting the miniature and simple configuration of an image forming apparatus. The LED array has a number of LEDs arranged in an array and has the individual LEDs controlled in accordance with image data so as to electrostatically form a latent image on a photoconductive element.

It is, in practice, impossible to produce an LED array with LEDs all having an identical characteristic. As a result, dots to be formed by the LEDs are different in diameter from each other. Particularly, in a printer of the type rendering tonality with a bidimensional or area tonality method in which one dot has two levels, the difference in dot diameter directly translates into an irregular density distribution and thereby lowers image quality as to tonality. Further, the quantity of light to issue differs from one LED to another LED, also resulting in an irregular density distribution and therefore low image quality.

In light of the above, Japanese Patent Laid-Open Publication Nos. 5-4376 and 5-50653, for example, each discloses an image forming apparatus using an LED array head with an implementation for making the quantities of light to issue from LEDs uniform. In the former document, the LED array head is subjected to laser trimming so as to adjust resistance and therefore the quantity of light. In the latter document, correction data for a uniform quantity of light are determined and stored in a ROM (Read Only Memory) beforehand. At the time of printing, the correction data are used to selectively turn on the LEDs, so that all the LEDs emit the same quantity of light.

However, although all the LEDs may emit the same quantity of light, it is impractical to make the diameters of all the dots formed on a photoconductive element uniform due to, e.g., differences in dot diameter and focus between the LEDs. Moreover, even if correction is so effected as to make the dot diameters uniform, the actual dot diameters differ from each other, depending on the resolution of the correction data. As a result, vertical stripes appear in an output image. While the correction accuracy will somewhat increase if the resolution of the correction data is increased, such a scheme not only involves a limit, but also increases the cost of the apparatus.

SUMMARY OF THE INVENTION

It is therefore an object of the present invention to provide an image forming apparatus including an LED array capable of freeing an image from vertical stripes even when LEDs are different in dot diameter from each other.

It is another object of the present invention to provide an image forming apparatus including an LED array capable of freeing an image from vertical stripes even when LEDs are different in dot diameter from each other under a situation requiring the dot diameter to be increased to a certain degree.

It is still another object of the present invention to provide an image forming apparatus capable of preventing vertical stripes from appearing in an image.

It is a further object of the present invention to provide an image forming apparatus capable of stabilizing image quality while preventing vertical stripes from appearing in an image.

In accordance with the present invention, in an image forming apparatus for electrophotographically forming an image with an LED (Light Emitting Diode) array having a number of LEDs arranged in an array for controllably emitting light in accordance with image data, dots to be respectively formed by the LEDs have a target dot diameter X satisfying a relation:

$$P < X < 2P$$

where P is a pitch P between the LEDs. Alternatively, the target dot diameter X may be so selected as to satisfy a relation:

$$2P < X < 3P$$

DESCRIPTION OF THE PREFERRED EMBODIMENTS

Figures 1A, 1B, 1C:
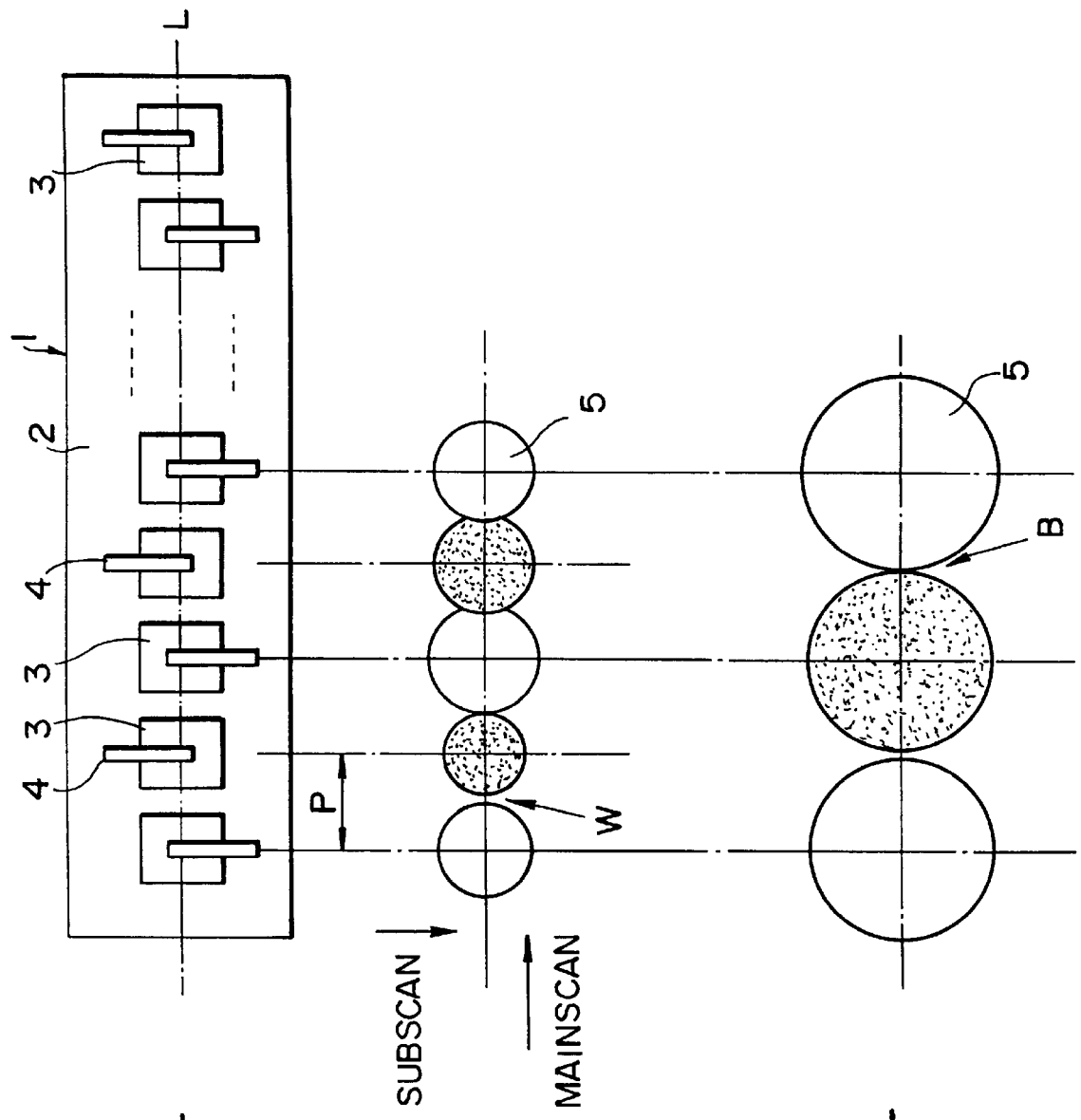
FIGS. 1A–1C are views demonstrating problems particular to a conventional LED array.

To better understand the present invention, brief reference will be made to an LED array head included in a conventional image forming apparatus, shown in FIG. 1A. As shown, the LED array head has a number of LEDs 3 arranged in an array on a base 2, as indicated by a line L. Electrodes 4 are respectively led out from the emitting portions of the LEDs 3 in the subscanning direction in a zigzag configuration. The LEDs 3 are arranged on the base 2 at a pitch P. Dots to be formed by the LEDs 3 are slightly different in diameter from each other. As shown in FIG. 1B specifically, when all the LEDs 3 are turned on, a white stripe W is apt to appear due to the difference in diameter between the resulting dots 5 and the distribution of the difference. That is, the quality of a solid image is lowered. Also, as shown in FIG. 1C specifically, when every other LED 3 is turned on, a black stripe B is apt to appear for the same reasons; black and white alternately appear in the resulting image.

Figure 2:
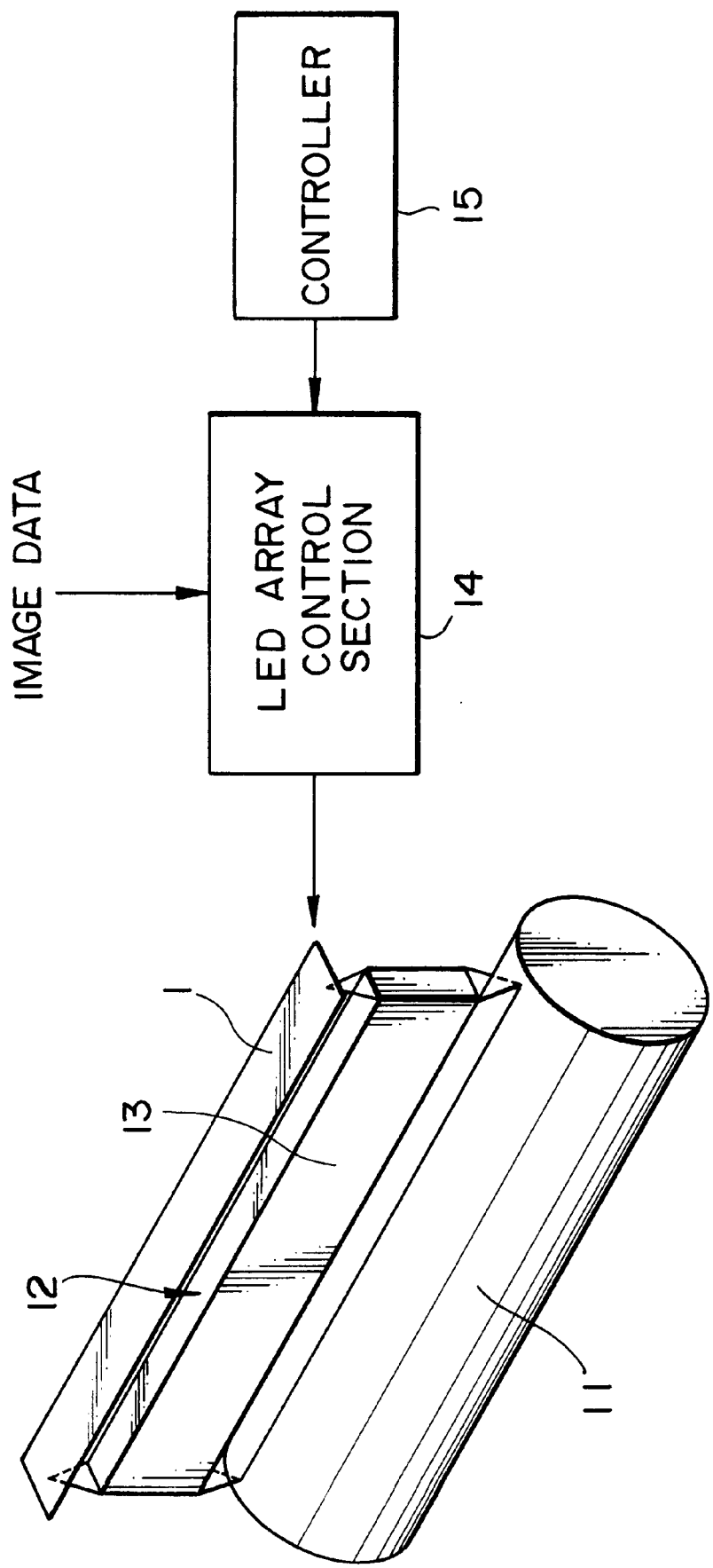
FIG. 2 shows a writing section included in an image forming apparatus embodying the present invention and including an LED array, and a control system included in the illustrative embodiment.
Figure 3A:
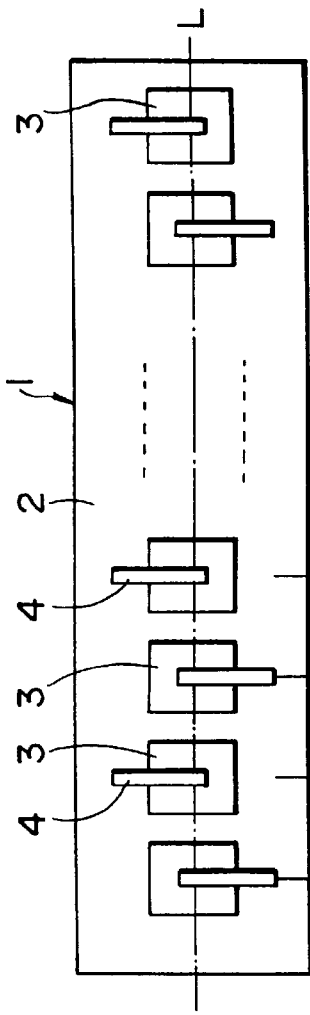
FIGS. 3A–3C show the LED array included in the illustrative embodiment.

Referring to FIG. 2, an image forming apparatus embodying the present invention is shown and implemented as an LED array printer by way of example. As shown, an optical writing section included in the LED array printer has an LED array head 12 facing a photoconductive drum or image carrier 11. The LED array head 12 is made up of an LED array 1 also having the configuration shown in FIG. 1A and a lens array 13. Specifically, as shown in FIG. 3A, the LED array 1 has a number of LEDs 3 arranged on a base 2 in an array, as indicated by a line L. Electrodes 4 are respectively led out from the LEDs 3 in the subscanning direction in a zigzag configuration.

As shown in FIG. 2, an LED array control section 14 is connected to the LED array 1 and receives image data. A controller 15 is connected to and controls the LED array control section 14. Basically, image data are fed from a frame memory, scanner or similar external unit to the LED array control section 14 with a main scan line synchronizing signal LSYNC serving as a trigger. The control section 14 causes the LEDs 3 of the LED array 1 to selectively emit light in accordance with the image data. Light issuing from the LEDs 3 are focused on the drum 11 via the lens array 13, electrostatically forming a latent image on the drum 11.

Figure 4:
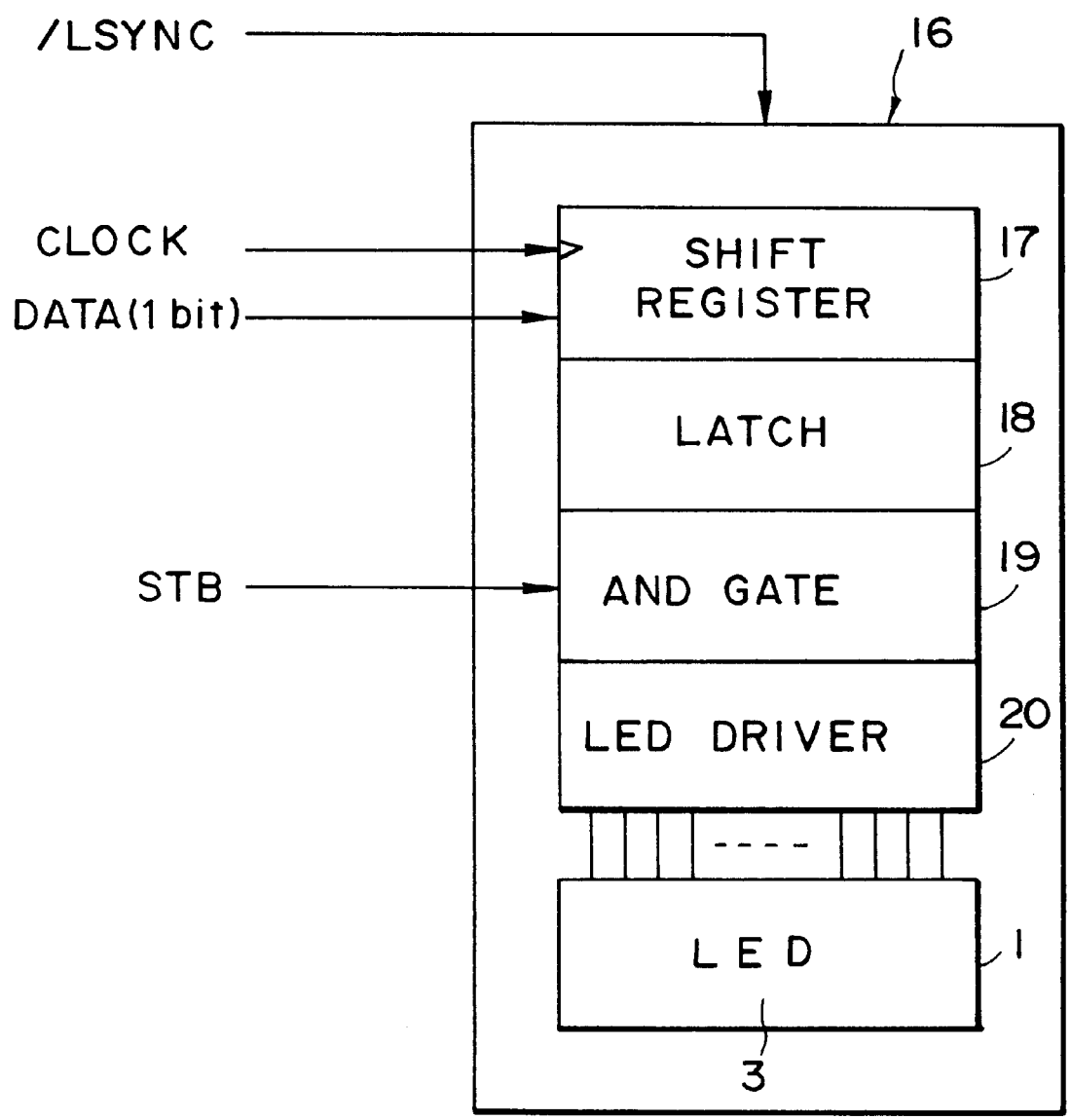
FIG. 4 is a block diagram schematically showing an LED array drive section also included in the illustrative embodiment.

FIG. 4 shows an LDE array drive section or drive means 16 included in the LED array control section 14 and having a conventional configuration. As shown, the LED array drive section 16 is made up of a shift register 17, a latch 18, an AND gate 19, and an LED driver 20. Bilevel image data in which a single dot has two levels, e.g., a (logical) ONE and a (logical) ZERO are sequentially input to the shift register 17 in synchronism with a clock signal CLOCK, dot #1 being first. Such dot data each is fed to a respective register within the shift register 17. When n dot data are fully input to the shift register 17, the latch 18 latches the data. When a strobe pulse STB is input to the AND gate 19, the LED driver 20 causes only the LEDs 3 received the ONE image data to emit light over the width of the strobe pulse STB.

Figure 5:
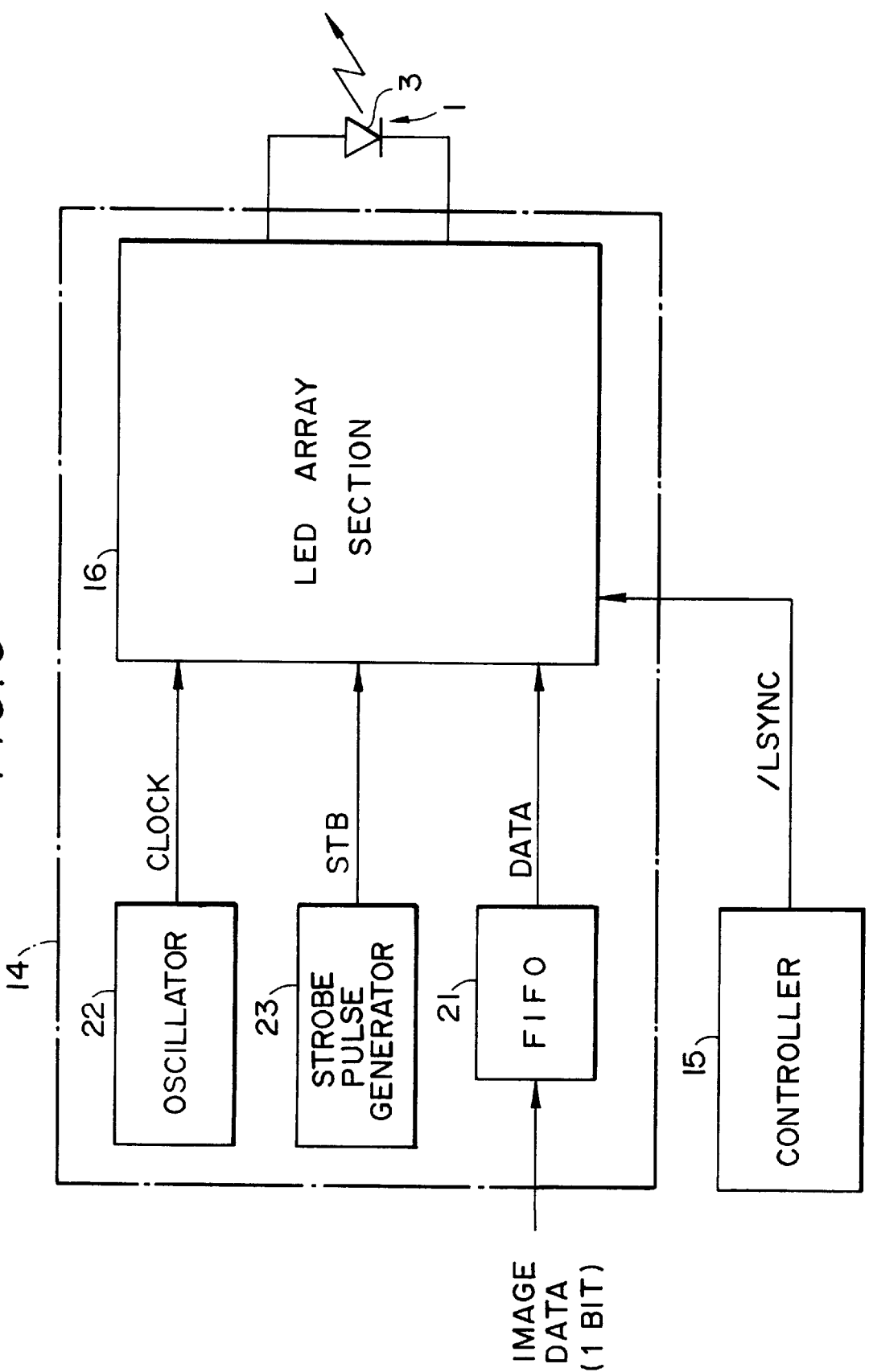
FIG. 5 is a block diagram schematically showing an LED array control section included in the control system of FIG. 3.
Figure 6:
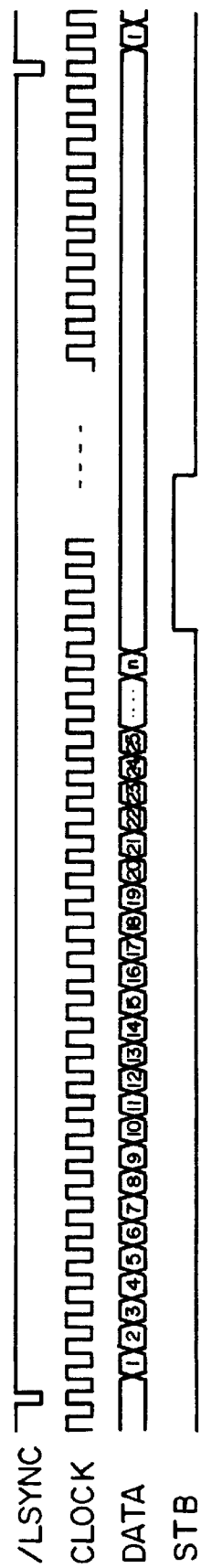
FIG. 6 is a timing chart showing a specific operation of the LED array control section of FIG. 5.

A specific configuration of the LED array control section 14 will be described with reference to FIG. 5. As shown, a FIFO (First-In First-Out) memory 21 is connected to the input side of the LED array drive section 16 and receives one line of bilevel image. Specifically, the FIFO memory 21 is reset by the synchronizing signal LSYNC output from the controller 15 and receives one line of image data in the main scanning direction. The LED array drive section 16 is also reset by the synchronizing signal LSYNC. The image data, or dots #1 through #n, are sequential ly fed from the FIFO memory 21 to the LED array drive section 16 in response to the clock signal CLOCK output from an oscillator 22. A strobe pulse generator 23 is connected to the drive section 16 and includes, e.g., a counter and a comparator. A specific strobe pulse STB output from the strobe pulse generator 23 is shown in FIG. 6. In the drive section 16, only the dots (LEDs 3) corresponding to the ONE image data emit light in synchronism with the strobe pulse STB.

In the illustrative embodiment, the technique taught in, e.g., Japanese Patent Laid-Open Publication No. 5-4376 or 5-50653 mentioned earlier is used to cause all the LEDs 3 to emit the same quantity of light. Further, assume that the target diameter of dots 24 to be formed by the LEDs 3 is X. Then, in the illustrative embodiment, the target dot diameter X is selected to be 1.5 times as great as the pitch P between the LEDs 3 (X=1.5P). Assuming that the LED array 1 has a resolution of 600 dpi (dots per inch), then the pitch P is 42.3 $\mu$m. X=1.5P is representative of the optimal condition in the range of P<X<2P. The target dot diameter X satisfying such a relation is selected such that the mean diameter of dots actual ly formed in images under various LED emission conditions and various development conditions is 1.5P. Further, the allowable deviation of the dot diameter from the target dot diameter X is selected to be less than ±P/4 inclusive.

Figure 3B:
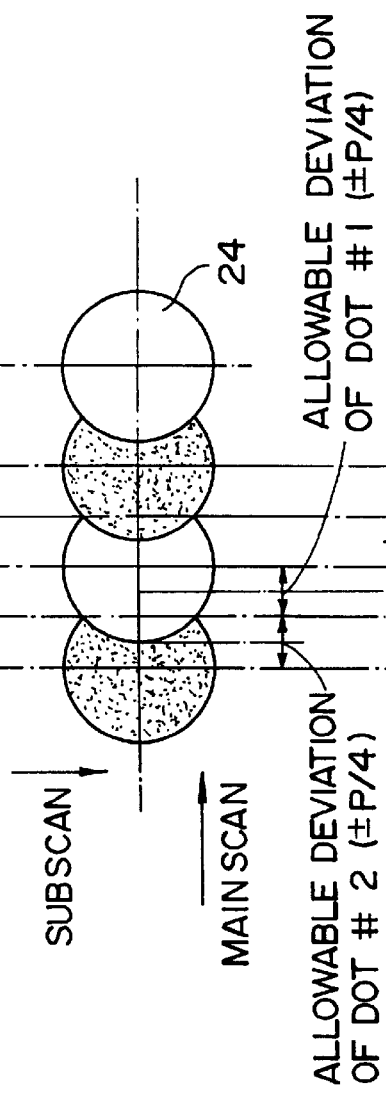

FIG. 3B shows a specific condition wherein all the LEDs 3 are turned on to form dots 24. It should be noted that although the dots 24 are shown as being different in density in FIG. 3B, the difference in density is used to simply distinguish nearby dots 24. This is also true with FIGS. 1A–1C and 7A–7D. Dots 24 formed by the LEDs 3 are slightly different in diameter from each other, as stated in relation to the conventional LED array head. However, so long as the deviation of the dot diameter from the target dot diameter X is less than ±P/4 inclusive, no conspicuous white stripes appear although some difference in density may occur, depending on the overlapping condition of nearby dots 24. In this connection, when the target dot diameter X is identical with the pitch P (X=P), white stripes sometimes appear even though the deviation of the dot diameter may be less than ±P/4. This prevents a desirable solid image from being achieved even when all the LEDs 2 are turned on. This is why X should be greater than P.

Figure 3C:
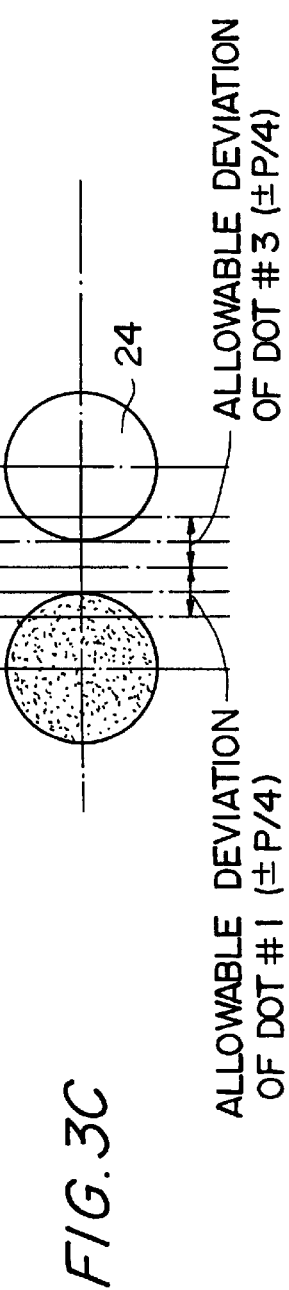

FIG. 3C shows another specific condition wherein every other LED 3 is turned on. Again, although the resulting dots are slightly different in diameter from each other, nearby dots 24 do not overlap so long as the deviation of the dot diameter from the target dot diameter X is less than ±P/4. Therefore, no conspicuous black stripes appear although some difference in density may occur due to a difference in width between non-printed portions corresponding to LEDs 3 not turned on. In this connection, when the target dot diameter X is double the pitch P (X=2P), black stripes sometimes appear due to the overlap of the dots 24 even though the deviation of the dot diameter may be less than ±P/4. As a result, a desirable image with black and white alternating with each other is not achieved despite the turn-on of every other LED 3. This is why X should be smaller than 2P.

Experiments were conducted with the LED array 1 having a resolution of 600 dpi (P=42.3 $\mu$m), with a target diameter X of 63.5 $\mu$m, and with the deviation of dot diameter of less than ±10.5. Under these conditions, a solid image free from conspicuous white stripes was produced when all the LEDs 3 were turned on. Also, an image with black and white alternating with each other and free from conspicuous black stripes was output when every other LED 3 was turned on. Of course, no vertical stripes appeared when the distance between the LEDs 3 turned on were increased, e.g., when every third LED 3 was turned on.

As stated above, in the illustrative embodiment, the target dot diameter X lies in the range of P<X<2P and is, e.g., 1.5P.

In this condition, despite that the dot diameters of the LEDs 3 may slightly differ from each other, an image free from noticeable white stripes or black stripes is achievable although some difference in density may occur, depending on the overlapping degree of or the distance between the dots 24. While the target dot diameter X may be defined in terms of an optical spot diameter on the drum 11, such definition must take account of the enlargement of a dot ascribable to development and other steps to follow. By using a dot diameter in an image subjected to development and other steps, as in the illustrative embodiment, it is possible to render vertical stripes inconspicuous more positively.

Moreover, the illustrative embodiment uses the one dot, bilevel scheme as an area tonality method belonging to a family of tonality rendering methods. Therefore, consideration should only be given to a single dot, so that image quality is stabilized.

Referring to FIGS. 7A–7D, an alternative embodiment of the present invention will be described. In FIGS. 7A–7D, structural elements identical with the elements shown in FIGS. 3A–3C are designated by identical reference numerals and will not be described specifically in order to avoid redundancy. The alternative embodiment is identical with the previous embodiment as to structure, drive timing, etc. The difference is that the alternative embodiment sets a different relation between the target dot diameter X and the pitch P, assuming a situation in which the relation P<X<2P is not available. Specifically, in this embodiment, the target diameter X is selected to be 2.5 times as great as the pitch P (X=2.5P). Again, assuming that the LED array 1 has a resolution of 600 dpi, then the pitch P is 42.3 $\mu$m. X=2.5P is representative of the optimal condition in the range of 2P<X<3P. The target dot diameter X satisfying such a relation is selected such that the mean diameter of dots actually formed in images under various LED emission conditions and various development conditions is 2.5P. The allowable deviation of the dot diameter from the target dot diameter X is selected to be less than ±P/4 inclusive, as in the previous embodiment.

Figure 7A:
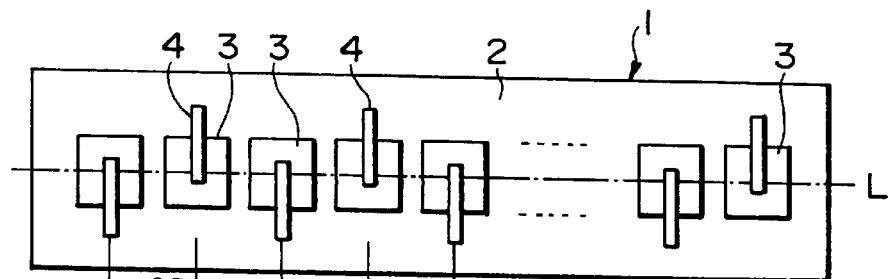
FIGS. 7A–7D show an alternative embodiment of the present invention.
Figure 7B:
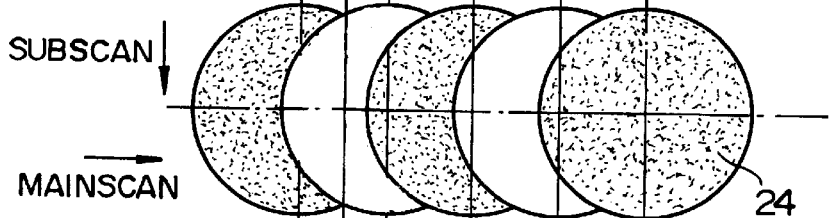

FIG. 7B shows the dots 24 formed in the illustrative embodiment when all the LEDs 3 are turned on. As shown, although the dot diameters of the LEDs 3 are different from each other, a full solid image is achievable because nearby dots 24 overlap each other over a large area.

Figure 7C:

FIG. 7C shows the dots 24 formed when every other LED 3 is turned on. As shown, although the dots 24 are different in diameter from each other, no conspicuous white lines appear so long as the deviation of the dot diameter from the target dot diameter X is less than ±P/4; some difference in density may occur due to a difference in the overlapping degree of the dots 24. In this connection, when the target dot diameter X is double the pitch P (X=2P), white stripes sometimes appear even though the deviation of the dot diameter may be less tan ±P/4. As a result, a desirable solid image is not achieved despite the turn-on of all the LEDs 3. This is why X should be greater than 2P.

Figure 7D:
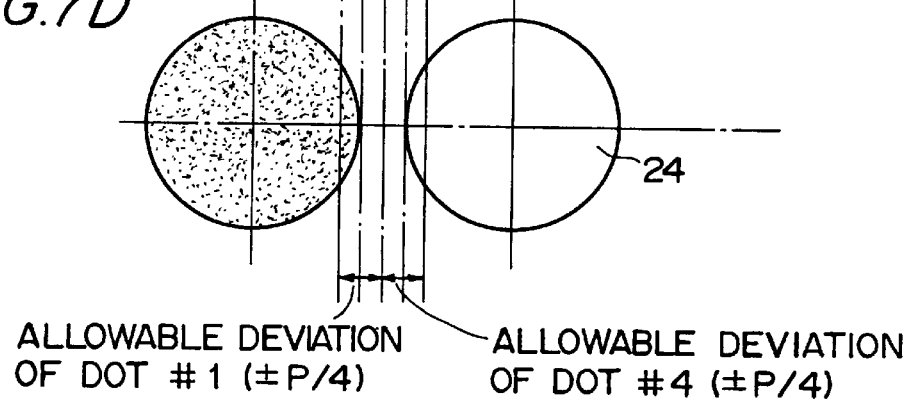

FIG. 7D shows the dots 24 formed when every third LED 3 is turned on. Again, although the dots 24 are slightly different in diameter from each other, nearby dots 24 do not overlap so long as the deviation of the dot diameter from the target diameter is less than ±P/4. Therefore, no conspicuous black stripes appear although some difference in density may occur due to a difference in width between non-printed portions corresponding to LEDs 3 not turned on. In this connection, when the target dot diameter X is three times as great as the pitch P (X=3P), black stripes sometimes appear due to the overlap of the dots 24 even though the deviation of the dot diameter may be less than ±P/4. As a result, a desirable image with black and white alternating with each other is not achieved despite the turn-on of every third LED 3. This is why X should be smaller than 3P.

Experiments were conducted with the LED array 1 having a resolution of 600 dpi (P=42.3 $\mu$m), with a target diameter X of 106 $\mu$m, and with the deviation of dot diameter of less than ±10.5. Under these conditions, a solid image free from conspicuous white stripes was produced not only when all the LEDs 3 were turned on, but also when every second LED 3 was turned on. Also, an image with black and white alternating with each other and free from conspicuous black stripes was output when every third LED 3 was turned on. Of course, no vertical stripes appeared when the distance between the LEDs 3 turned on were increased, e.g., when every fourth LED 3 was turned on.

As stated above, this embodiment selects a target dot diameter lying in the range of 2P<X<3P, e.g., 2.5P in a situation requiring the dot diameter to be increased to a certain degree. Therefore, despite that the dot diameters of the LEDs 3 may slightly differ from each other, an image free from noticeable white stripes or black stripes is achievable although some difference in density may occur, depending on the overlapping degree of or the distance between the dots 24. As for the other advantages, this embodiment is identical with the previous embodiment.

The embodiments shown and described are directed toward correction for causing the LEDs 3 to emit the same quantity of light. When the present invention is applied to an LED array printer capable of controlling dots to be formed by the LEDs 3 to the same diameter, it is possible to further improve image quality because of a decrease in the scatter of dot diameter. A modified embodiment of the present invention for providing dots to be formed by the LEDs 3 with the same diameter will be described with reference to FIGS. 8–14. The method to be described is similarly applicable to the setting of the target dot diameter X itself.

Figure 8:
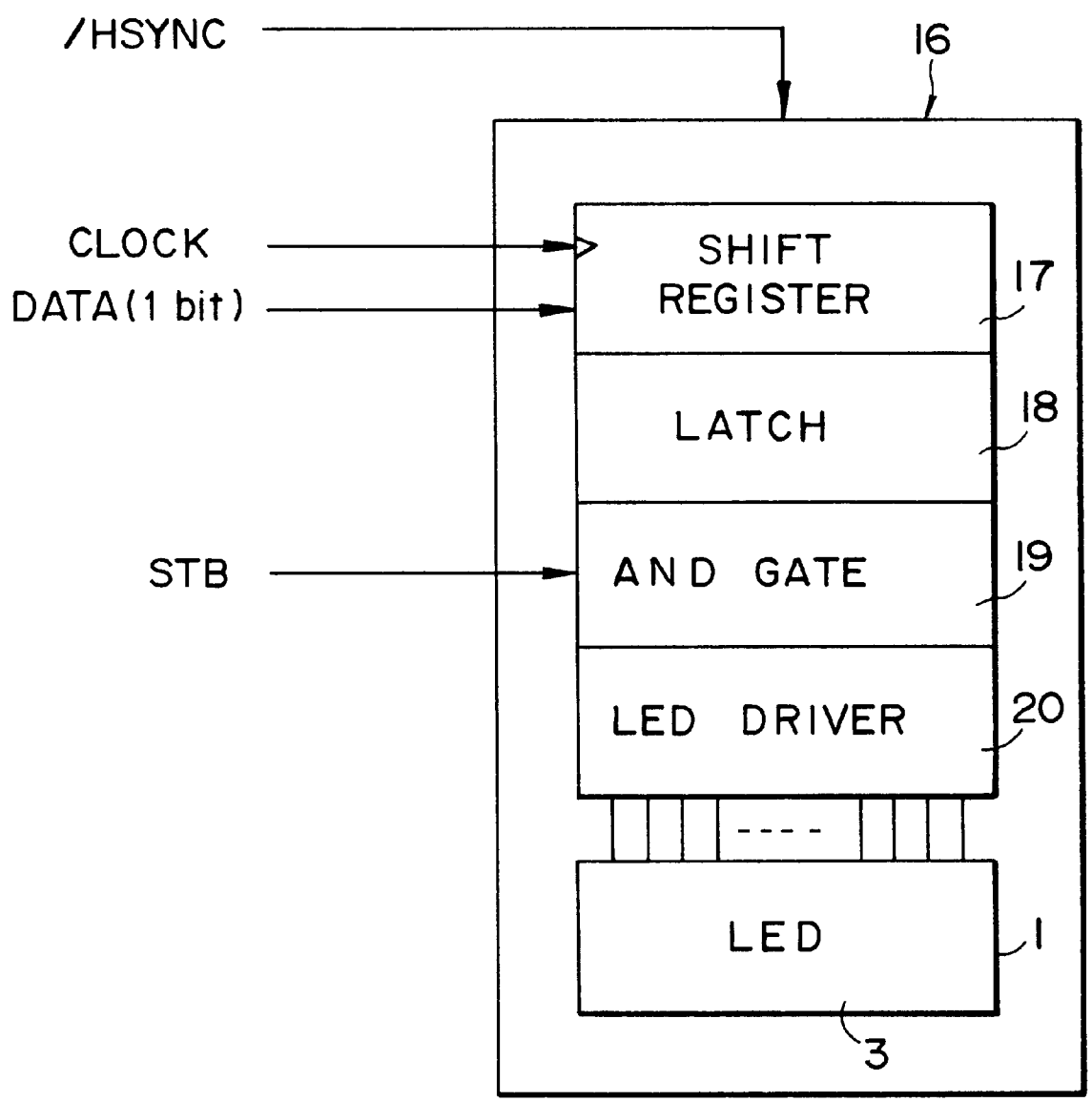
FIG. 8 is a schematic block diagram showing a modified form of the LED array drive section of FIG. 4.
Figure 9:
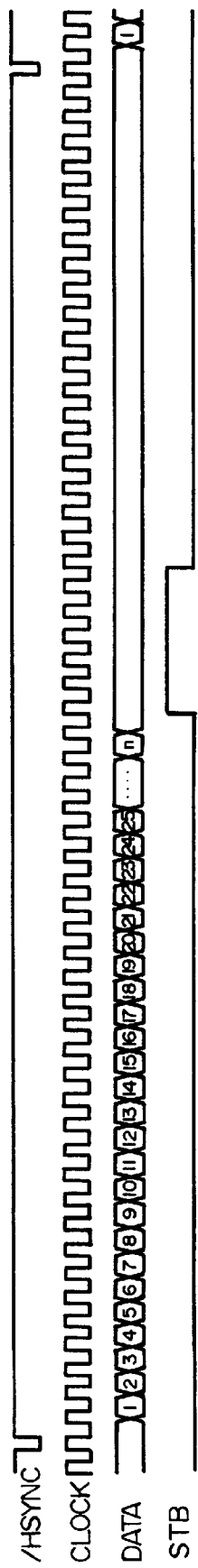
FIG. 9 is a timing chart demonstrating a specific operation of the LED array drive section of FIG. 8.

FIG. 8 shows the LED array drive section 16 basically identical with the LED array drive section 16 of FIG. 4. The difference is that use is made of an octuplicate synchronizing signal HSYNC produced by dividing the line synchronizing signal LSYNC into eight. Therefore, as shown in FIG. 9, the shift register 17 is so constructed as to be reset by the octuplicate synchronizing signal HSYNC. Again, bi level image data having two levels for a dot and each being a ONE or a ZERO are sequentially input to the shift register 17 in synchronism with the clock signal CLOCK, dot #1 being first. Such dot data each is fed to a respective register within the shift register 17. When N dot data are fully input to the shift register 17, the latch 18 latches the data. When a strobe pulse STB is input to the AND gate 19, the LED driver 20 causes only the LEDs 3 received the ONE image data to emit light over the width of the strobe pulse STB.

Figure 10:
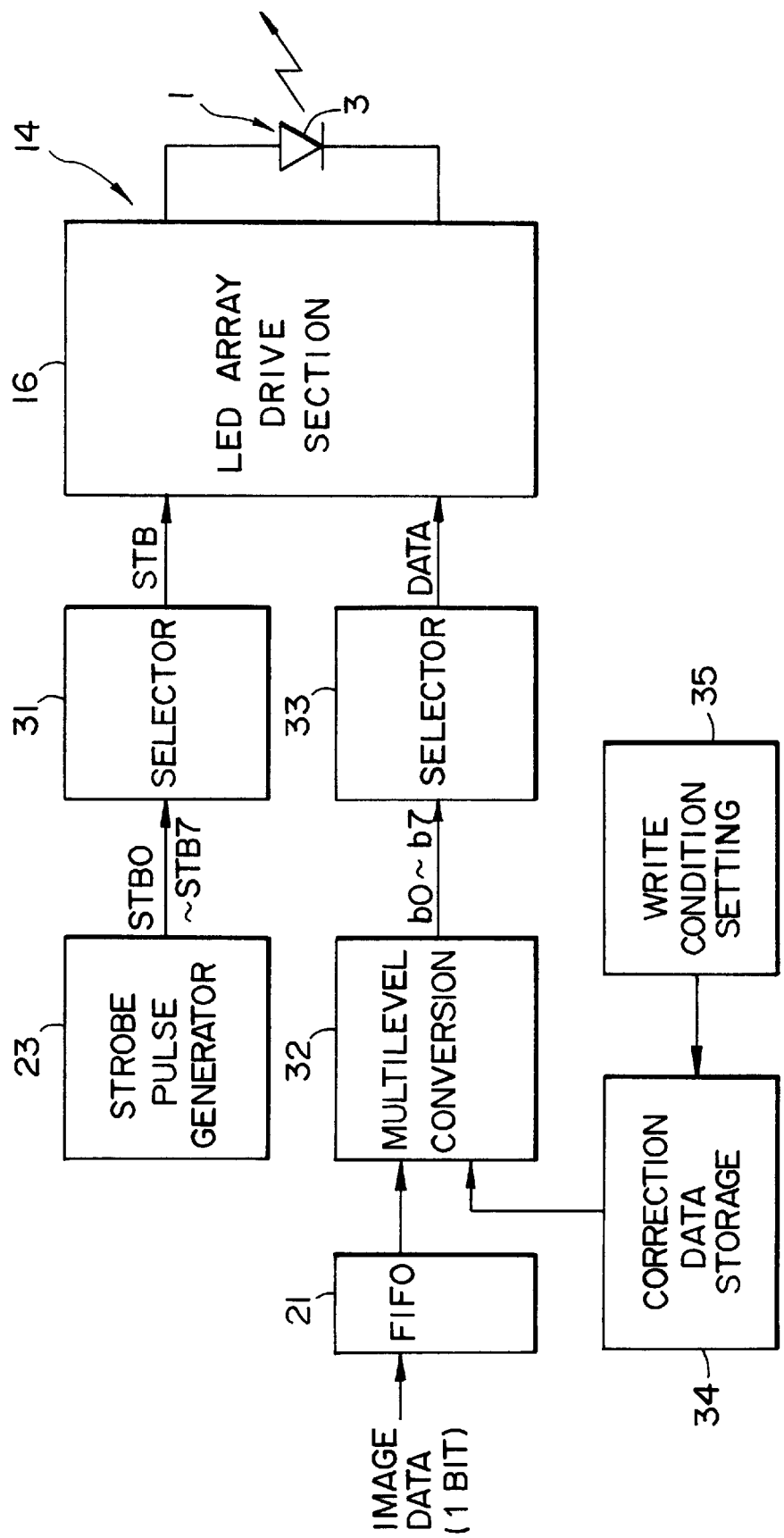
FIG. 10 is a block diagram schematically showing an optical writing device in accordance with the present invention.

As shown in FIG. 10, the strobe pulse generator 23 is connected to the LED array drive section 16 via a selector 31 and includes, e.g., a counter and a comparator. The strobe pulse generator 23 is capable of outputting eight different kinds of strobe pulses STB0–STB7. Assuming that the strobe pulse STB0 has a width of t, then the other strobe pulses STB1, STB2, STB3, STB4, STB5, STB6 and STB7 respectively have widths of 2t, 4t, 8t, 16t, 32t, 64t, and 128t. Assume that octuplicate timings produced by dividing one line into eight by the octuplicate synchronizing signal HSYNC are T0–T7. Then, the selector 31 selects the strobe pulse STB0 at the timing T0. Likewise, the selector 31 selects the other strobe pulses STB1–STB7 at the timings T1–T7, respectively. The strobe pulses STB0–STB7 each is fed from the selector 31 to the AND gate 19.

A multi level conversion 32 is connected to the LED array drive section 16 via a selector 33 and implemented by, e.g., an AND gate. The multilevel conversion 32 feeds eight-bit data b0–b7 to the selector 33. The selector 33 transfers the data b0 to the shift register 17 at the timing T0. Likewise, the selector 33 transfers the data b1–b7 to the shift register 17 at the timings T1–T7, respectively. The FIFO memory 21 for storing one line of image data and a correction data storage 34 are connected in parallel to the input side of the multi-level conversion 32. The correction data storage 34 implemented by, e.g., a ROM stores correction data for setting up a particular spot diameter D for each image forming condition and determined beforehand by a measuring method which will be described later. A write condition setting 35 for setting an image writing condition is connection to the correction data storage 34. When the write condition setting 35 designates a certain image forming condition at the time of image formation, correction data corresponding to the designated image forming condition are read out of the storage 34 and fed to the multilevel conversion 32.

Figure 11:
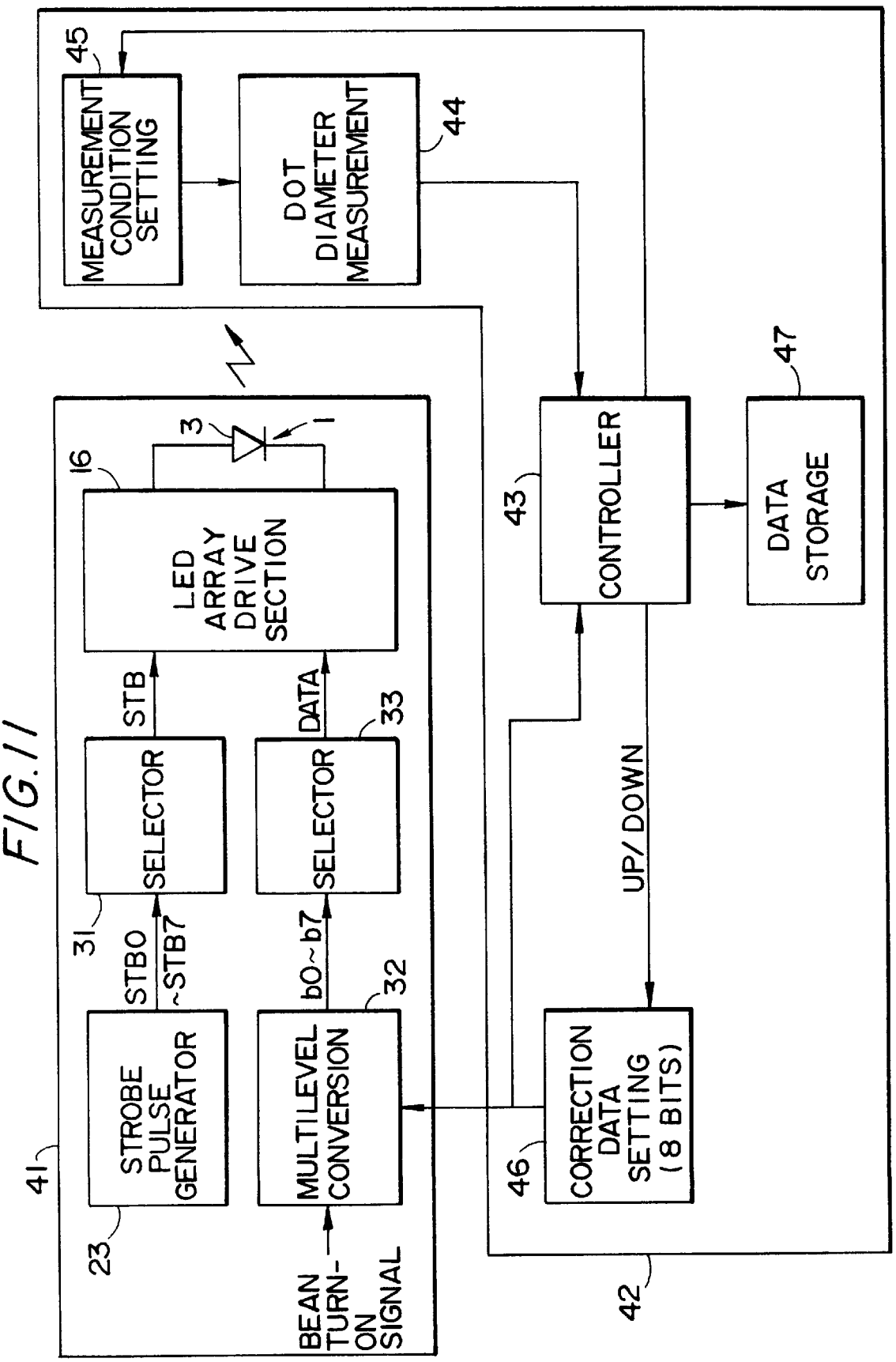
FIG. 11 is a schematic block diagram showing the optical writing device of FIG. 10 together with a dot diameter data measuring device.

A procedure for obtaining the correction data to be stored in the correction data storage 34 beforehand is as follows. As shown in FIG. 11, the correction data are determined by use of an optical writing device 41 and a dot diameter data measuring device 42 included in the LED array printer. The dot diameter data measuring device 42 is removably connected to the multi level conversion 32 of the optical writing device 41 via an interface not shown. The device 42 is made up of a controller 43 including a microcomputer, a dot diameter measurement 44 for measuring a beam spot diameter (spot diameter) when each LED 3 is turned on and feeding the measured spot diameter to the controller 43, a measurement condition setting 45 for setting the measurement condition of the measurement 44, a correction data setting 46 for feeding eight-bit correction data to the multilevel conversion 32 under the control of the controller 43, and a data storage 47 for storing correction data when the correction data is fixed.

Figure 12:
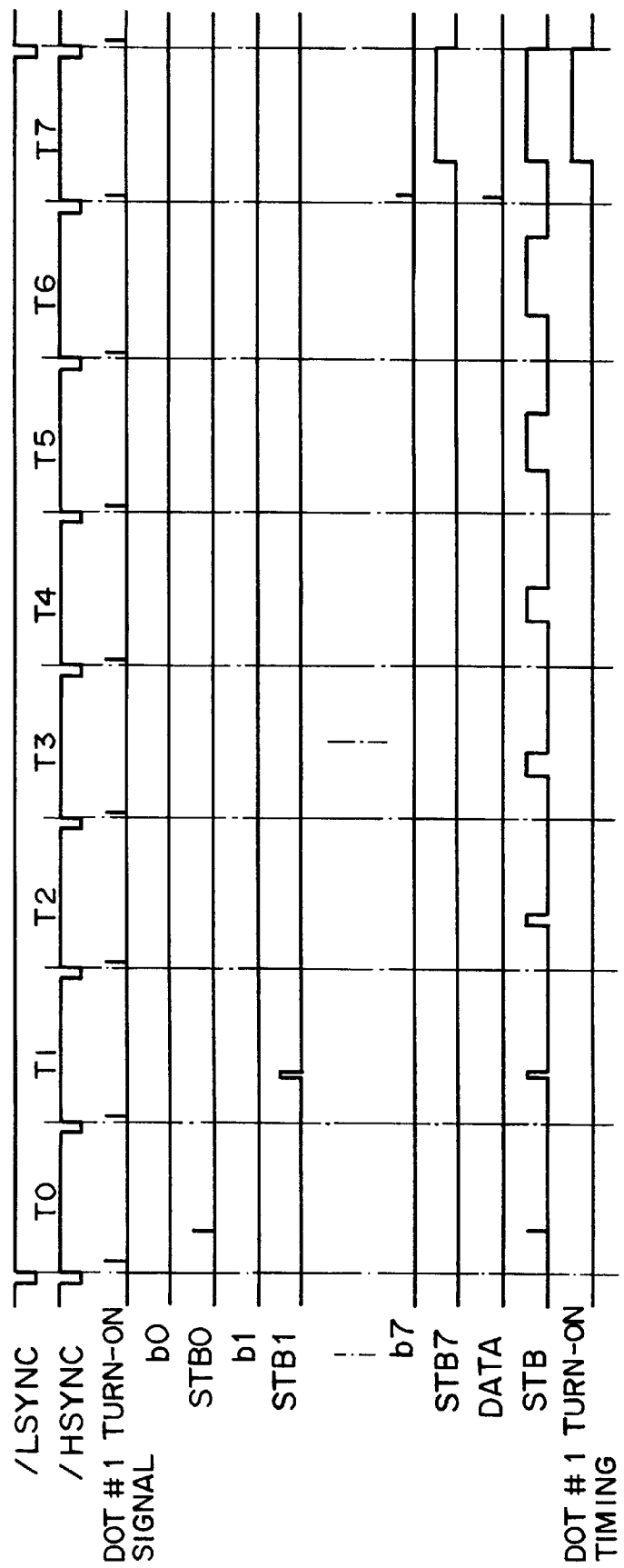
FIG. 12 is a timing chart showing a specific operation of a light quantity control system of the type varying the duration of emission.

The correction data relating to the quantity of light to issue from the individual LED 3 is implemented as eight-bit data (b0–b7) for varying the duration of turn-on. The lowest bit b0 and the highest bit b7 are respectively allocated to the timings T0 and T7 produced by dividing the turn-on of one line into eight in accordance with the octuplicate synchronizing signal HSYNC, as stated earlier. Likewise, the bits b1–b6 are allocated to the timings T1–T6, respectively. A dot corresponding to one of the eight bits which is ONE is turned on over the width of a strobe pulse STBx at a corresponding timing Tx. FIG. 12 shows a specific drive timing at which the dot #1 (LED #1) is turned on by correction data "128" (="10000000"). While a single line synchronizing signal LSYNC is output, the strobe pulses STB–STB7 are output from the strobe pulse generator 23 and selector 31 at the corresponding timings T0–T7 of the octuplicate synchronizing signal HSYNC. A turn-on signal meant for the dot #1 is output for every synchronizing signal HSYNC and ANDed by the multilevel conversion 32. As a result, the dot #1 is turned on over the width of the strobe pulse STB7 at the timing of the bit b7 representative of the correction data "128" (=T7). If the correction data is "127" (="01111111"), then the dot #1 will be turned on over the widths of the strobe pulses STB0–STB6 at the timings of the bits b0–b6 (=T0–T6), respectively. On the other hand, if the correction data is "129" (="100000001"), then the dot #1 will be turned on over the widths of the strobe pulses STB0 and STB7 at the timings of two bits b0 and b7 (=T0 and T7), respectively. Such a variable light quantity system is one of conventional methods for obtaining one dot, multilevel light quantities in relation to one-dot, multi level tonality rendering (see "Color Electrophotographic Printer Using LED Array Writing", Papers of the Institute of Electrophotographic Engineers of Japan, Vol. 24, No. 3, 1995. This system is readily applicable even to the correction data of this modification for varying the diameter of dots each being rendered by two levels.

Figure 13:
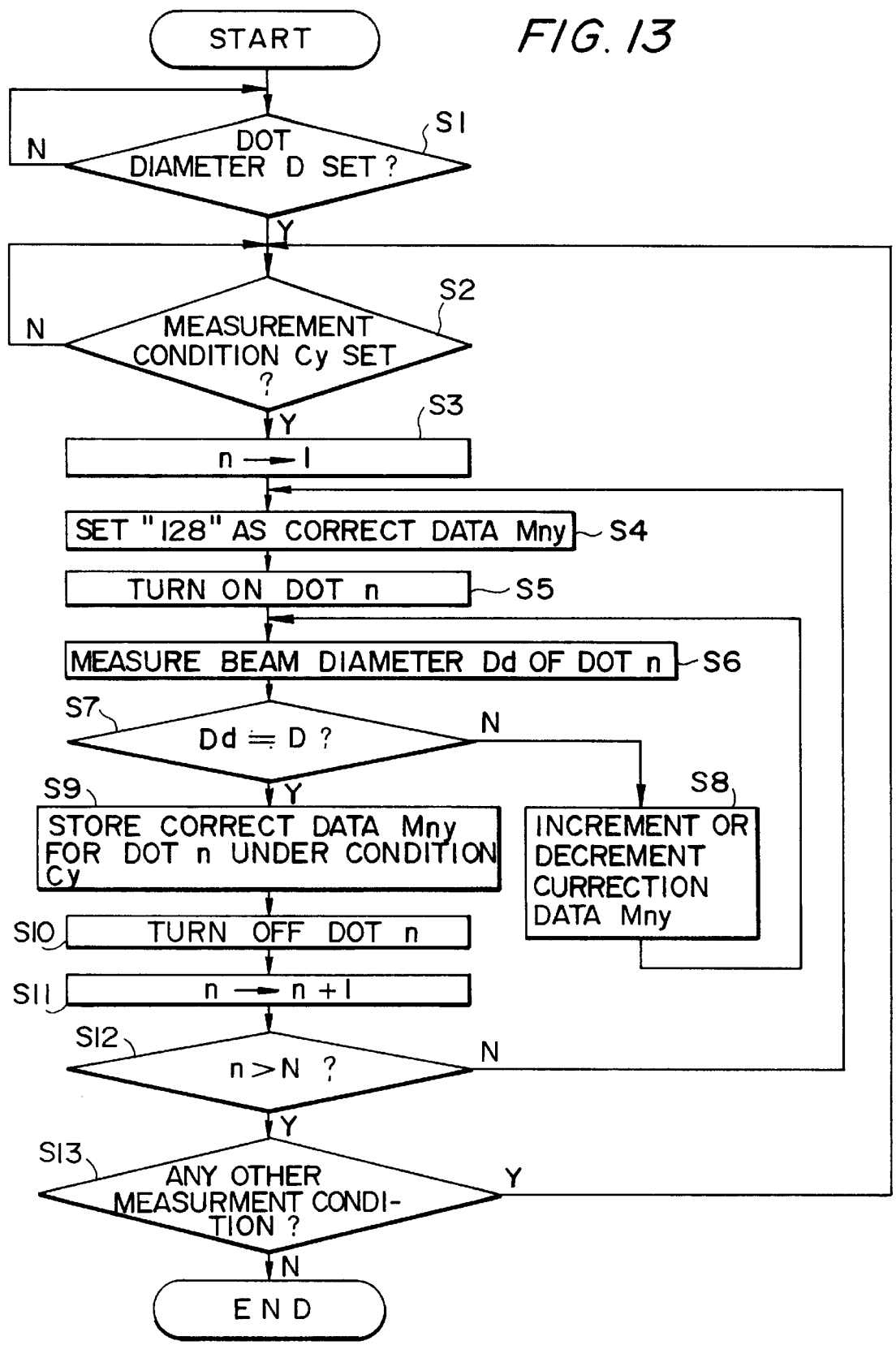
FIG. 13 is a flowchart representative of a specific procedure for obtaining correction data.
Figure 14:
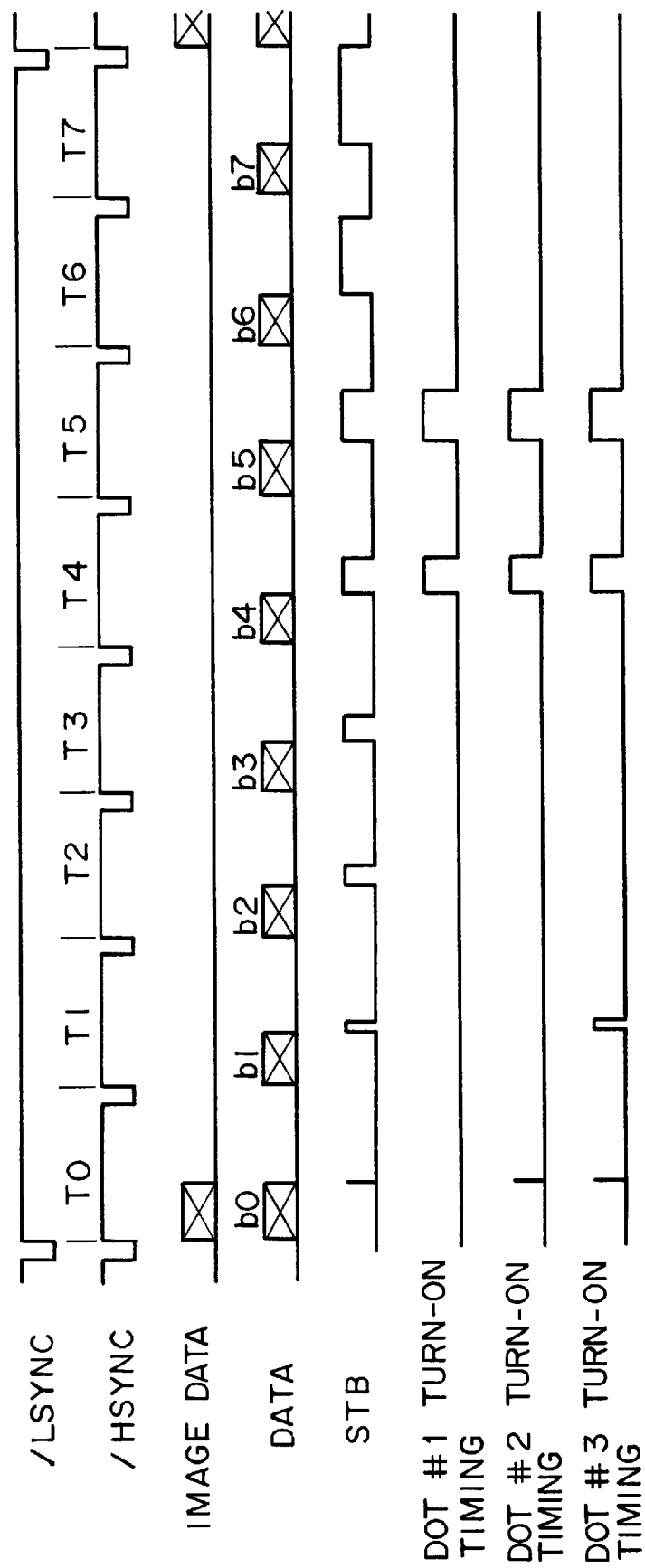
FIG. 14 is a timing chart showing a specific timing at which dots are turned on in accordance with correction data.

Reference will be made to FIG. 13 for describing a specific procedure for obtaining light quantity correction data which provide all of the N LEDs 3 with a desired dot diameter D at all times. While the dot diameter may be defined as a dot diameter in an output image, it is assumed to be a spot diameter in the following description. Let measurement conditions corresponding to exposure conditions or similar image forming conditions be labeled Cy (y=1 through Y which is open to choice).

The procedure shown in FIG. 13 begins with a step S1 of determining whether or not a preselected target dot diameter D (corresponding to the target dot diameter X) has been set by the measurement condition setting 45. The target dot diameter D refers to a dot diameter to be set at the time of actual image writing. If the answer of the step S1 is positive (Y), then whether or not a measurement condition Cy (y=1) has been set by the setting 45 is determined (step S2). Why a measurement condition is set is that the dot diameter varies in accordance with the quantity of light selected as a threshold; a measurement condition matching with one of exposure conditions for actual image writing is set. If the answer of the step S2 is Y, then "1" is set as n so as to execute measurement with the dot #1 (LED #1) (step S3). Subsequently, "128" (="10000000") is tentatively set as correction data Mny, i.e., correction data for the LED #n under the measurement condition (step S4). The numerical value "128" is only illustrative and may be replaced with any other numerical value between "0" and "255". However, the medium value "128" which is easy to increment or decrement or a numerical value indicated to be closest to the target dot diameter D by existing experimental data should preferably be used. The correction data Mny is set in the correction data setting 46 and fed to the multi level conversion 32.

After the step S4, the LED array drive section 16 turns on the dot (LED #1) (step S5). This timing is shown in FIG. 12. The dot diameter measurement 44 measures the dot diameter (spot diameter) Dd of the resulting dot #n (step S6) and delivers the measured dot diameter to the controller 43. The controller 43 determines whether or not the dot diameter Dd is nearly equal to the preselected dot diameter D (step S7). If the answer of the step S7 is negative (N), then the correction data Mny is incremented or decremented, depending on the relation in size between the diameters Dd and D (step S8). For example the correction data Mny may be incremented to "129" or decremented to "127" although it may be incremented or decremented by two or more. Again, the dot diameter Dd of the dot #n derived from the above new correction data is measured (step S6). Such a procedure is repeated until the dot diameter Dd nearly coincides with the preselected dot diameter D. Originally, the decision in the step S7 should be whether or not the dot diameter Dd is exactly the same as the preselected diameter D. However, because the two diameters Dd and D may not always be identical due to, e.g., the number of bits of the correction data Mny and the measurement error of the diameter Dd, the illustrative embodiment determines the diameter Dd to be acceptable if it lies in an allowable approximate range. The allowable approximate range is determined in consideration of the number of bits of the correction data Mny, the measurement error of the dot diameter Dd, the deviation of the dot diameter allowable with respect to the target image quality of an actual image.

When the measured dot diameter Dd is nearly equal to the preselected dot diameter D (Y, step S7), the correction data Mny relating to the dot n and measured under the condition Cy (y=1) is written to the data storage 47 (step S9). It is to be noted that this correction data Mny is the numerical value set in the correction data setting 46 at that time. Subsequently, the dot n, i. e., dot #1 (LED #1) in this case is turned off (step S10), and then n is incremented by 1 (one) in order to execute measurement with the next dot n, i. e., dot #2 (LED #2) (step S11). At this instant, whether or not the new dot n is in excess of the total number of dots N is determined (step S12). If the answer of the step S12 is N, then the steps S4–S11 are repeated with the dot n. By such a sequence of steps, correction data Mny for causing the dot diameter Dd to coincide with the preselected dot diameter D is written to the data storage 47 dot by dot (n=1 through N).

If the answer of the step S12 is Y, then whether or not any other measurement condition Cy is present is determined (step S13). If the answer of the step S13 is Y, then the above steps are repeated with the measurement condition being sequentially changed to Cy (y=2), Cy (y=3), . . . , Cy (y=Y) (step S1). The resulting correction data Mny are also written to the data storage 47 condition by condition.

As a result, after the above measurement, the data storage 47 stores the dot-by-dot correction data Mny with the measurement conditions Cy serving as addresses:

| Condition | Correction Data |
|---|---|
| $C_1$ | $M_{11}\ M_{21}\ M_{31}\ \ldots\ M_{N1}$ |
| $C_2$ | $M_{12}\ M_{22}\ M_{32}\ \ldots\ M_{N2}$ |
| . . . | |
| $C_Y$ | $M_{1Y}\ M_{2Y}\ M_{3Y}\ \ldots\ M_{NY}$ |

The correction data stored in the data storage 47 are written to the correction data storage 34 of the optical writing device 41 by use of, e.g., a ROM writer to be used for actual image formation.

When the optical writing device 41 actually writes an image by using the correction data storage 34 storing the correction data Mny condition by condition, an image forming condition is set by the write condition setting 35. The image forming condition corresponds to any one of the measurement conditions. When an image forming condition corresponding to, e.g., the measurement condition Cy is set, the correction data Mny designated by the corresponding measurement data Cy are read out of the correction data storage 34 and fed to the multilevel conversion 32. For example, in the case of the measurement condition $C_2$, the correction data $M_{12}$, $M_{22}$, $M_{32}$, . . . , $M_{N2}$ are read out.

Assume M12="48" (="00110000"), M22="49" (="00110001") and M32="51" (="00110011") by way of example. Then, the dots are turned on at timings shown in FIG. 14. Specifically, one line of image data having two levels for a bit are input to the FIFO memory 21. The image data are repeatedly output from the FIFO memory 21 in synchronism with the octuplicate synchronizing signal HSYNC. On the other hand, the eight-bit correction data for the dots (LEDs 3), like the image data, are repeatedly output from the correct ion data storage 34 in synchronism with the synchronizing signal HSYNC. The multi level conversion 32 ANDs the image data and correction data and delivers the resulting eight-bit data (b0–b7) to the selector 33. The selector 33 selects the lowest bit b0 to the highest bit b7 at the timings T0–T7, respectively. The strobe pulse generator 23 outputs the strobe pulses STB0–STB7 each having a particular width at the timings T0–T7, respectively. The dot #1, for example, turns on at the timings T4 and T5 in accordance with the strobe pulses STB4 and STB5, respectively. The dot #2 turns on at the timings T0, T4 and T5 in accordance with the strobe pulses STB0, STB4 and STB5, respectively. The dot #3 turns on at the timings T0, T1, T4 and T5 in accordance with the strobe pulses STB0, STB1, STB4 and STB5, respectively. As a result, all the dots on one line have the same dot diameter (spot diameter) D.

In summary, it will be seen that the present invention provides an image forming apparatus having various unprecedented advantages, as follows. Despite that the dot diameters of LEDs may slightly differ from each other, an image free from noticeable white stripes or black stripes is achievable although some difference in density may occur, depending on the overlapping degree of or the distance between dots. Further, the apparatus does not have to take account of the enlargement of dots due to, e.g., development and can therefore render vertical stripes in an image inconspicuous more positively. In addition, because the LEDs each is control led on the basis of image data having two levels for a dot, consideration should only be given to a single dot diameter. This successfully stabilizes image quality.

Various modifications will become possible for those skilled in the art after receiving the teachings of the present disclosure without departing from the scope thereof.

What is claimed is:

1. An image forming apparatus for electrophotographically forming an image, comprising:

an LED (Light Emitting Diode) array having a number of LEDs arranged in an array and configured to controllably emit light in accordance with image data, wherein dots to be respectively formed by said LEDs have a target dot diameter X satisfying a relation:

P<X<2P where P is a pitch P between said LEDs, said pitch being defined as a distance between center longitudinal axes of electrodes of adjacent LEDs.

2. An apparatus as claimed in claim 1, wherein said LEDs emit light in accordance with the image data in which a single dot has two level.

3. An apparatus as claimed in claim 1, where in sa id target dot diameter X is defined as a dot diameter in an output image.

4. An apparatus as claimed in claim 3, wherein said LEDs emit light in accordance with the image data in which a single dot has levels.

5. An image forming apparatus for electrophotographically forming an image, comprising:

an LED array having a number of LEDs arranged in an array and configured to controllably emit light in accordance with image data, wherein dots to be respectively formed by said LEDs have a target dot diameter X satisfying a relation:

2P<X<3P where P is a pitch P between said LEDs, said pitch being defined as a distance between center longitudinal axes of electrodes of adjacent LEDs.

6. An apparatus as claimed in claim 5, wherein said LEDs emit light in accordance with the image data having two levels for a dot.

7. An apparatus as claimed in claim 5, wherein said target dot diameter X is defined as a dot diameter in an output image.

8. An apparatus as claimed in claim 7, wherein said LEDs emit light in accordance with the image data in which a single dot has too levels.

* * * * *